United States Patent Office 3,372,278
Patented Mar. 5, 1968

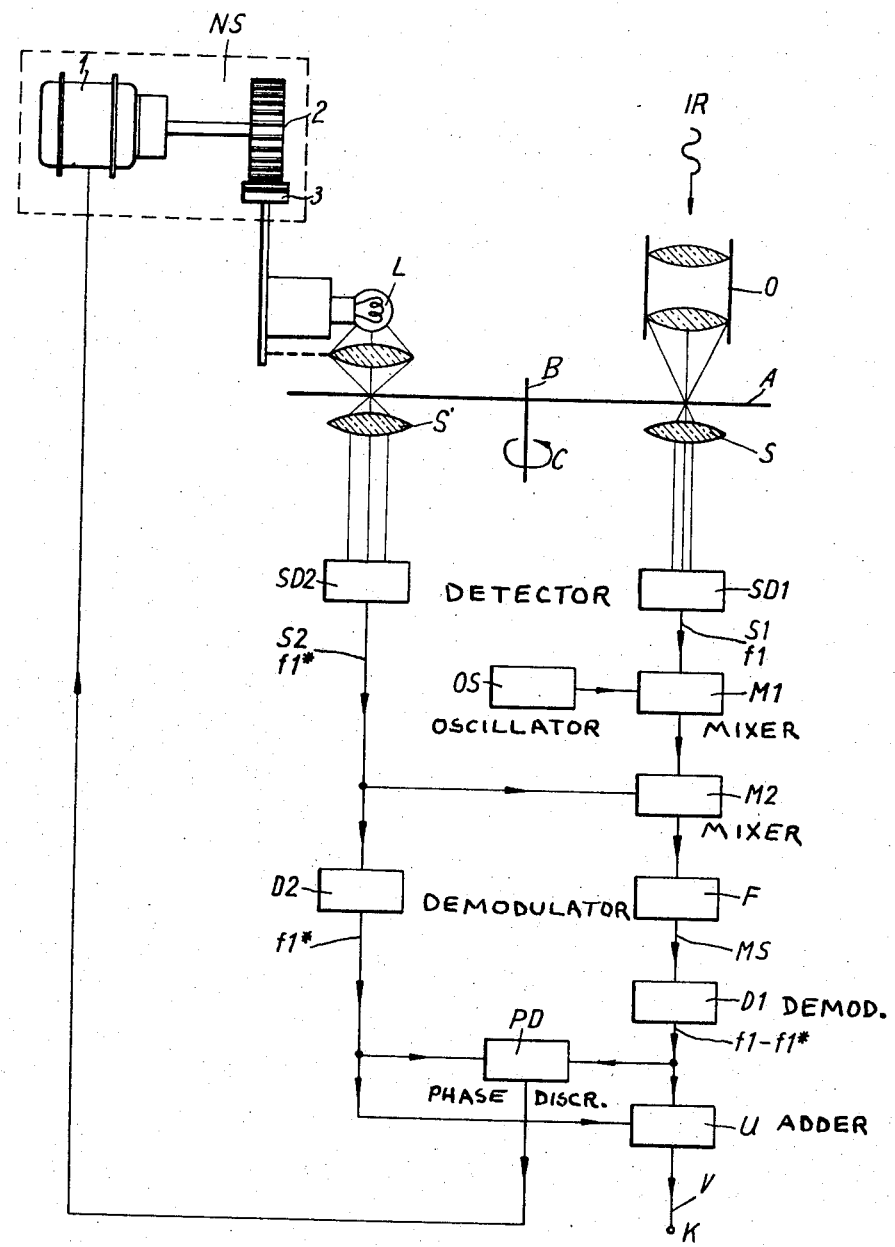

3,372,278
APPARATUS FOR LOCATING SOURCES OF INFRARED RADIATION
Peter Aemmer, Milwaukee, Wis., assignor to Albiswerk Zurich S.A., Zurich, Switzerland, a Swiss corporation
Filed Feb. 9, 1966, Ser. No. 526,159
Claims priority, application Switzerland, Feb. 15, 1965, 2,025/65
5 Claims. (Cl. 250—83.3)

My invention relates to apparatus for locating sources of infrared radiation by measuring at least one angular coordinate relative to the optical axis of the apparatus. More particularly, the invention relates to IR ranging apparatus comprising an objective lense system for projecting an image of the target space onto a scanning member in front of a radiation detector, the scanning member being so designed that each infinitesimal image element produces in the radiation detector an oscillatory signal which is frequency-modulated with a sinusoidal oscillation and has a high modulation index.

An IR ranging apparatus for automatically measuring and pursuing targets operates by measuring the angle between an optical axis and a target axis. The optical axis is identical with the reference direction inherent in the apparatus. The target axis is constituted by the geometric connecting line between the apparatus and the IR source to be located. The target axis and the optical axis intersect at the center point of the measuring system, this point being near the entrance pupil of an objective for infrared radiation. For evaluation of the information, it is advisable to resolve this angle into two angular components or coordinates, namely azimuth and elevation.

A decisive property of an IR ranging apparatus is the distance up to which a heat-radiating target can be located. This distance depends upon the energy which, to some extent, can be influenced by choice of the aperture of the objective. Enlarging the radiation receiving cross section of the objective increases the radiation density of the images received and consequently the effective distance, until the sensitivity is no longer limited by the inherent noise but by spurious radiation also entering through the objective.

Aside from limiting the radiation range by optical spectral filters, the use of the space filtering technique is important. The latter technique employs criteria of the geometric expanse of useful radiators and of background noise for increasing the effective locating distance. A particular technique has been developed for deriving information from the incoming heat radiation. Mechanically moving masks, the so-called scanning members, in conjunction with a collimating optic and a radiation detector, such as a photocell, sensitive to heat radiation, are employed for scanning the image projected by the telescopic optic. In accordance with the image content, the photocell is thus caused to issue an electrical signal which is tested in an electronic processor for any information content and is converted to corresponding electrical magnitudes which are proportional to the annular coordinates of the target.

The scanning member is provided with periodically recurring scanning patterns. Due to continuous and uniform motion, for example rotation of the scanning member, the scanning patterns passing through the imaging beam have the effect of producing an electrical signal in the radiation detector. This signal is periodic, and hence corresponds to a carrier wave, when the image element is at standstill. The scanning pattern can thus be electrically characterized by the time response curve of the signal at the radiation detector with reference to an infinitesimal image element.

For further elucidation, let us refer a scanning pattern to a planar coordinate system located in the image plane and having a fixed relation to the optical axis. Assume that the directions of the angular coordinates ($\xi$, $\eta$) are defined as follows: For the $\eta$-axis the coordinate direction is the inverse travel direction of the scanning pattern, and for the $\xi$-axis the coordinate direction is the ordinate perpendicular to the inverse travelling direction. Assume further that an image at the location ($\xi j$, $\eta k$), having the radiation density $i(\xi j, \eta k) = 1$ and the dimension of $d\xi$, $d\eta$, is being scanned by the scanning pattern. Then the temporal course of the signal at the radiation detector is $dU(\xi j, \eta k, t)$. The time curve of this function may correspond to an oscillation frequency modulated by a superimposed sinusoidal oscillation. The scanning pattern is to be composed in such a manner that the positional coordinates ($\xi j$, $\eta k$) of the image element are discernible as modulation parameters from the thus modulated oscillation:

$$dU(\xi j, \eta k, t) = 1 - \tfrac{1}{2}\{\cos[\omega_H(1+m(\xi j, \eta k)\omega_N \cos(\omega_N t - \phi_N(\xi j, \eta k))t - \phi_H]\} \quad (1)$$

In this equation, $\omega_H$ denotes the radian frequency of the modulated carrier oscillation, m=modulation index, $\omega_N$=radian frequency of the modulation oscillation, and $\phi_N$=phase angle of the modulation oscillation, and $\phi_N$=phase angle of the carrier oscillation. For the further considerations, assume that a scanning pattern modulates only the $\eta$ coordinate in the modulation parameters, namely so that the phase angle $\phi_N$ is in a linear relation to the coordinate $\eta$. This simplifies the foregoing equation 1 as follows:

$$dU(\eta k, t) = 1 - \tfrac{1}{2}\{\cos[\omega_H(1+m\omega_H \cos\{\omega_N t - \phi_N(\eta)\})t - \phi_H]\} \quad (2)$$

For evaluating the $\eta$-coordinate of the location of the radiation image $i(\xi, \eta)$ from the frequency modulated sinusoidal oscillation, it is necessary to demodulate the signal shown by Equation 2 in a frequency demodulator.

It is well known from the theory of frequency-modulation transmissions that above a critical signal threshold the signal-to-noise ratios of an FM-demodulator increase with increasing modulation index. However, for a given sine-shaped modulation oscillation, the required transmission bandwidth must increase approximately in proportion to the modulation index. This has the consequence that, for a given signal power, the noise power increases with increasing band width of the transmission, if the noise is produced by the input of the receiver or the radiation detector and the first amplifying stages in our particular application. Under these conditions, the ratio of noise power to signal power at the input terminals of the frequency modulator increases approximately with the square root of the transmission band width. It is found that the critical signal threshold, above which the noise reduction of the system is effective, also increases to the same extent.

In the infrared locating technique as well as in the transmission technique, it is desirable to find methods which, for a given modulation index, reduce the critical signal threshold without imparing the favorable noise conditions above this threshold. Known techniques of this kind reduce the modulation index of an FM-signal after suitable amplification, employing FM-countermodulation in a negative-feedback closed-loop circuit. Such FM-countermodulation methods require that the modulation index for the highest frequency to be transmitted be much larger than unity.

It is an object of my invention to utilize the concepts and advantages of the FM-countermodulation method in apparatus of the above-described type for locating sources of infrared radiation.

According to the invention, I provide the IR-source locating apparatus with an auxiliary local radiator which, through the same scanning member as the one used for scanning the incoming radiation from the extraneous source being investigated, produces in a second radiation detector a second oscillation frequency modulated with a sinusoidal oscillation and having a phase position which is adjustable by displacement of the auxiliary radiation source with respect to the phase position of the modulated sinusoidal oscillation derived from the IR radiation being investigated. I further provide the apparatus with a mixing stage for mixing the two oscillations thus generated and connect to the output of the mixing stage a narrow band-pass filter for selecting a filtered modulated mixing product. Connected to the filter output is a first frequency discriminator for demodulating the mixer output signal. I further provide a second frequency discriminator for demodulating the second oscillation, and a phase discriminator for measuring the phase angle between the two demodulated oscillations. The output voltage of the phase discriminator is provided to control the position of the auxiliary radiator.

According to another feature of my invention, I provide the apparatus with an adding stage which forms the sum signal of the two demodulated oscillations, this sum signal constituting a measure of the angular coordinate to be determined.

The invention will be further explained with reference to an embodiment of an infrared locating system according to the invention shown by way of example in the accompanying drawing by a schematic illustration of the optical system components in conjunction with a diagram of the appertaining electronic devices.

An optical objective O, such as a telescope, projects an image of the source of infrared radiation IR onto a scanner disc member A having differently permeable zones. The radiation passing through the scanner member A enters through a collimating optic S onto a radiation detector SD1, such as a lead sulphide photoconductor.

The scanner member A is constituted by a circular transparent plate mounted on a vertical shaft B which, during operation of the system, is kept in continuous rotation at constant angular speed, this being schematically indicated by an arrow C. The disc A is provided with the above-mentioned scanning patterns which modulate the intensity of the infrared radiation impinging on the detector SD1 in such a manner that the angular position related to an image element is discernible as modulation parameter of the modulated oscillation. In the illustrated embodiment, the electrical signal issuing from the radiation detector SD1 may be looked upon as being essentially a carrier oscillation S1 frequency-modulated by a sinusoidal oscillation $f1$. Connected to the output of the frequency detector SD1 is a mixer stage M1 in which the carrier oscillation S1 is mixed with an oscillation of a higher frequency furnished from an oscillator OS.

The same scanner disc A is irradiated from the point-shaped auxiliary light source L whose light passes through a collimating optic S′ onto a photocell SD2. The output signal of photocell SD2 is likewise composed of a carrier oscillation S2 frequency-modulated by a sinusoidal oscillation $f1*$.

A second mixer stage M2 has two inputs connected to the respective outputs of mixer M1 and photocell SD2 so that the first signal from the first mixer stage M1 and the second signal from the photocell SD2 are mixed in stage M2. The mixing product is filtered out in a filter F connected to the output of mixer M2. The filtered mixed product appears at the filter output as a new signal MS and is supplied to a first frequency discriminator D1 for demodulation.

The oscillation corresponding to the radiation from the local source L is further supplied from the detector SD2 to a second frequency discriminator D2 for demodulation. The first signal from the frequency discriminator D1 may be designated as $f1-f1*$, and the second signal from the frequency discriminator D2 as $f1*$. These two signals are supplied to a phase discriminator PD whose output voltage is used as a control voltage for the servo-system NS of the local light source L. Simultaneously, the two signals $f1-f1*$ and $f1*$ are added in an adding network U to a sum voltage V which corresponds to the angular coordinate. This voltage V is taken from an output terminal K and, upon amplification in a servo-amplifier (not illustrated), may be employed in known manner for directional correction of the optical axis.

The servo-system NS positioning the light source L is schematically shown to comprise a reversible motor 1 which will run in one or the other direction depending upon the positive or negative polarity of the control voltage arriving from the output of the phase discriminator PD. The shaft of the motor 1 drives a gear 2 meshing with a rack 3 which is mechanically connected with the light source L and the appertaining projector lens system, thus shifting the composite source in a direction perpendicular to the plane of illustration.

The illustrated system affords lowering the critical signal threshold for FM-demodulation. In the mixer stage M1, the frequency-modulated oscillation issuing from the radiation detector SD1 is transposed to an intermediate frequency with the aid of the oscillator OS. Preferably the intermediate frequency is higher than the carrier frequency of the signal. The first intermediate-frequency signal is mixed with the signal of the internal, auxiliary radiator L. Due to filtering, there results a second intermediate-frequency oscillation MS. A suitable position of the auxiliary radiation source L has the effect that the frequency modulation on the second intermediate frequency MS will virtually vanish or is greatly reduced, this being exactly the same effect as obtained on the principle of countermodulation.

The intermediate-frequency amplifier, illustrated in the drawing by a filter F only, may have a considerably narrower frequency band than that occupied by the signal S1. The noise power, relating to the signal power, is reduced by the reduction in band width on the intermediate frequency, and the critical threshold is lowered. Of course, this expedient causes the signal voltage to become reduced behind the frequency discriminator D1, due to the fact that the countermodulation reduces the modulation index of the frequency-modulated oscillation. This, however, does not involve any loss of original information. At the output of the discriminator D1, there appears the difference of the two low-frequency sinusoidal oscillations which determine the position of the radiation source being located. To be added to this difference oscillation is the sinusoidal oscillation from the internal radiator L, this oscillation being indicative of the position of the radiator L. This second sinuoidal oscillation is obtained at the discriminator D2 which demodulates the noise-free frequency-modulated signal of the internal radiator L. It is not critical to this performance that the position of the internal radiator L be exactly such that the two modulations on the intermediate-frequency oscillation MS exactly compensate each other. It is only essential that the frequency deviation be reduced sufficiently so that substantially only the first two sidebands of the resultant frequency modulation are present.

The infrared radiation source being located or tracked may perform any motion within the field of view. Consequently, the internal radiation source L must follow any such motion. This can be achieved by providing an automatic servo-control. The control voltages for the servo-system are available in a very simple manner. Since modulation and countermodulation are derived from the same scanner member, the voltage vectors of the demodulated signals $f1-f1*$, $f1*$ have equal magnitudes. For small phase angles, and only these are permissible, the difference vector of the resultant frequency modulation is approximately perpendicular to the vector of the countermodulation, but may be directed toward one or the other side. Since a correct travel direction of the internal radiator L is tantamount to regulating the angle between the two vectors toward zero, a control voltage can be obtained with the aid of a phase discriminator if this discriminator is supplied with the voltage of the countermodulation as a reference and with the voltage of the demodulated mixed signal MS. Due to the fact that a slight phase angle does not involve an error in tracking of the external radiation source, the inevitable time delay inherent in the servo control does not constitute an information delay with respect to the tracking proper.

While in the illustrated embodiment the frequency conversion is effected in the signal path of the signals coming from the IR-radiation detector SD1, using for this purpose the mixing stage M1, it will be obvious that the frequency conversion may just as well be effected in the path of the signals derived from the photocell SD2, in which case the components OS, M1, M2, F are to be analogously connected between the components SD2 and D2, instead of between SD1 and D1.

I claim:

1. In apparatus for locating sources of infrared radiation by measuring at least one angular coordinate relative to the optical axis of the apparatus, said apparatus having a first radiation detector, an objective for projecting an image of the source-containing space onto said first detector, and a scanning member disposed between said detector and said objective for causing said detector to issue for each infinitesimal image element a first oscillating and frequency-modulated signal, the improvement which comprises a second radiation detector on one side of said scanning member, an internal auxiliary radiator situated on the other side of said scanning member for irradiating said second detector through said scanning member to produce in said second detector a second oscillating and frequency-modulated signal, said radiator being displaceable relative to said second detector for adjusting the phase position of said second signal relative to the phase position of said first signal, a mixer stage connected to said two detectors for mixing said first and second signals, a filter connected to said mixer stage for furnishing a modulated mixed signal, a frequency discriminator stage connected to said mixer stage for demodulating said mixed signal, a second frequency discriminator stage connected to one of said two detectors for demodulating the signal issuing therefrom, a phase discriminator connected to said two frequency discriminator stages for measuring the phase angle between the two demodulated signals, said phase discriminator having an output voltage indicative of said phase angle, positional control means mechanically connected with said auxiliary radiator and electrically connected to said phase discriminator for displacing said radiator in the phase-angle reducing sense under control by said output voltage, and an adding stage connected to said two frequency discriminator stages and having an output voltage corresponding to the sum of said two demodulated signals and indicative of the angular coordinate being measured.

2. In IR-source locating apparatus according to claim 1, said second frequency discriminator stage having an input connected to said second detector for demodulating said second signal.

3. IR-source locating apparatus according to claim 1, comprising frequency converting means connected between one of said two detectors and said mixer stage.

4. IR-source locating apparatus according to claim 1, comprising frequency changing means interposed between one of said detectors and said mixer stage for converting said first signal to a higher frequency.

5. IR-source locating apparatus according to claim 2, comprising frequency increasing converter means interposed between said first radiation detector and said mixer stage.

No references cited.

RALPH G. NILSON, *Primary Examiner.*

A. B. CROFT, *Assistant Examiner.*